No. 752,339. PATENTED FEB. 16, 1904.
A. GUTSTEIN.
SHEARS.
APPLICATION FILED JULY 16, 1903.
NO MODEL.
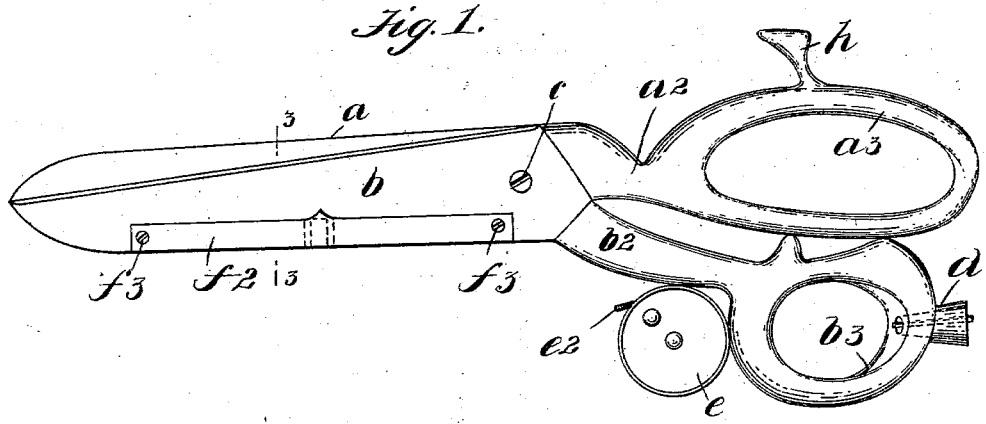
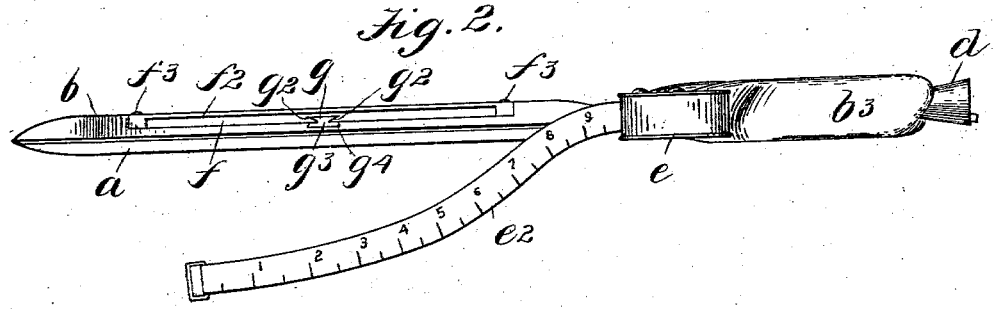
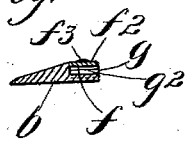
WITNESSES
F. A. Stewart
E. E. Mulreany
INVENTOR
Adolf Gutstein
BY
Edgar Tate & Co.
ATTORNEYS No. 752,339. Patented February 16, 1904.

UNITED STATES PATENT OFFICE.

ADOLF GUTSTEIN, OF NEW YORK, N. Y., ASSIGNOR OF ONE-HALF TO HEINRICH LICHT, OF NEW YORK, N. Y.

SHEARS.

SPECIFICATION forming part of Letters Patent No. 752,339, dated February 16, 1904.

Application filed July 16, 1903. Serial No. 165,755. (No model.)

*To all whom it may concern:*

Be it known that I, ADOLF GUTSTEIN, a subject of the Emperor of Austria-Hungary, residing at New York, in the county of New York and State of New York, have invented certain new and useful Improvements in Shears, of which the following is a specification, such as will enable those skilled in the art to which it appertains to make and use the same.

This invention relates to tailors' shears; and the object thereof is to provide a pair of shears of this class which may be used for various purposes; and with this and other objects in view the invention consists in a pair of shears constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of a pair of shears made according to my invention; Fig. 2, a view at right angles thereto, and Fig. 3 a section on the line 3 3 of one of the blades of the shears.

In the practice of my invention I provide a pair of shears of the class specified comprising two blades $a$ and $b$, pivoted together in the usual manner, as shown at $c$. The blades $a$ and $b$ are provided with the usual shanks $a^2$ and $b^2$, respectively, and the shank $a^2$ is provided with the large finger-hole member $a^3$ and the shank $b^2$ with the thumb-hole member $b^3$, in the back part of which is placed a pencil-sharpening device $d$, which may be of any preferred construction.

In front of the finger-hole member $b^3$ of the shank $b^2$ of the blade $b$ and secured to said member and said shank or to either of them is an ordinary tape-measure casing $e$, provided with an ordinary tape-measure $e^2$, and this tape may be drawn out of the casing $e$ and used whenever desired and may be rewound in said casing in the usual manner.

The blade $b$ is provided at the back thereof with a longitudinal recess or chamber $f$, covered by a plate $f^2$, which is secured to said blade at its opposite ends, as shown at $f^3$, and the plate $f^2$ is made of spring material. Detachably connected with the blade $b$, centrally of the chamber $f$ and transversely of said chamber, is a chalk-sharpening blade $g$, both sides of which are provided with cutting edges $g^2$, and this blade is provided with a tongue member $g^3$, which fits in a corresponding groove $g^4$ in the blade $b$. The plate $f^2$, which covers the chamber $f$, is preferably secured to the blade $b$ by means of screws and may be removed or detached from said blade whenever desired, so as to sharpen the chalk-sharpening blade $g$ and for any other purpose.

It is customary with tailors to use a flat piece of chalk, and whenever it is desired to sharpen one edge thereof the said edge is inserted into the chamber $f$ at one side of the blade $g$ and the said chalk is drawn across said blade, and in this operation the plate $f^2$ is pressed outwardly, but holds the chalk closely adjacent to the cutting edge of the blade $g$, and in this manner the edge of the chalk may be quickly and properly sharpened, as will be readily understood.

The finger-hole member $a^3$ of the shank $a^2$ of the blade $a$ is provided with a foot or guide $h$ in the form of construction shown, and it will be understood that for the purpose of cutting cloth or other material my improved shears are used in the same manner as other devices of this class, and whenever it is desired to sharpen a piece of chalk or a pencil my improved shears may also be used for such purposes, and by means of my improvement a measuring-tape is always at hand and ready for use.

Having fully described my invention, what I claim as new, and desire to secure by Letters Patent, is—

A pair of tailors' shears, one of the blades of which is provided with a chalk-sharpening device comprising a longitudinal recess in the back part thereof, a spring-plate secured to said blade and forming a cover for said recess, and a cutting device detachably secured transversely of said recess, and provided with edges at its opposite sides, substantially as shown and described.

In testimony that I claim the foregoing as my invention I have signed my name, in presence of the subscribing witnesses, this 15th day of July, 1903.

ADOLF GUTSTEIN.

Witnesses:
 F. A. STEWART,
 C. E. MULREANY.